United States Patent Office 3,146,821
Patented Sept. 1, 1964

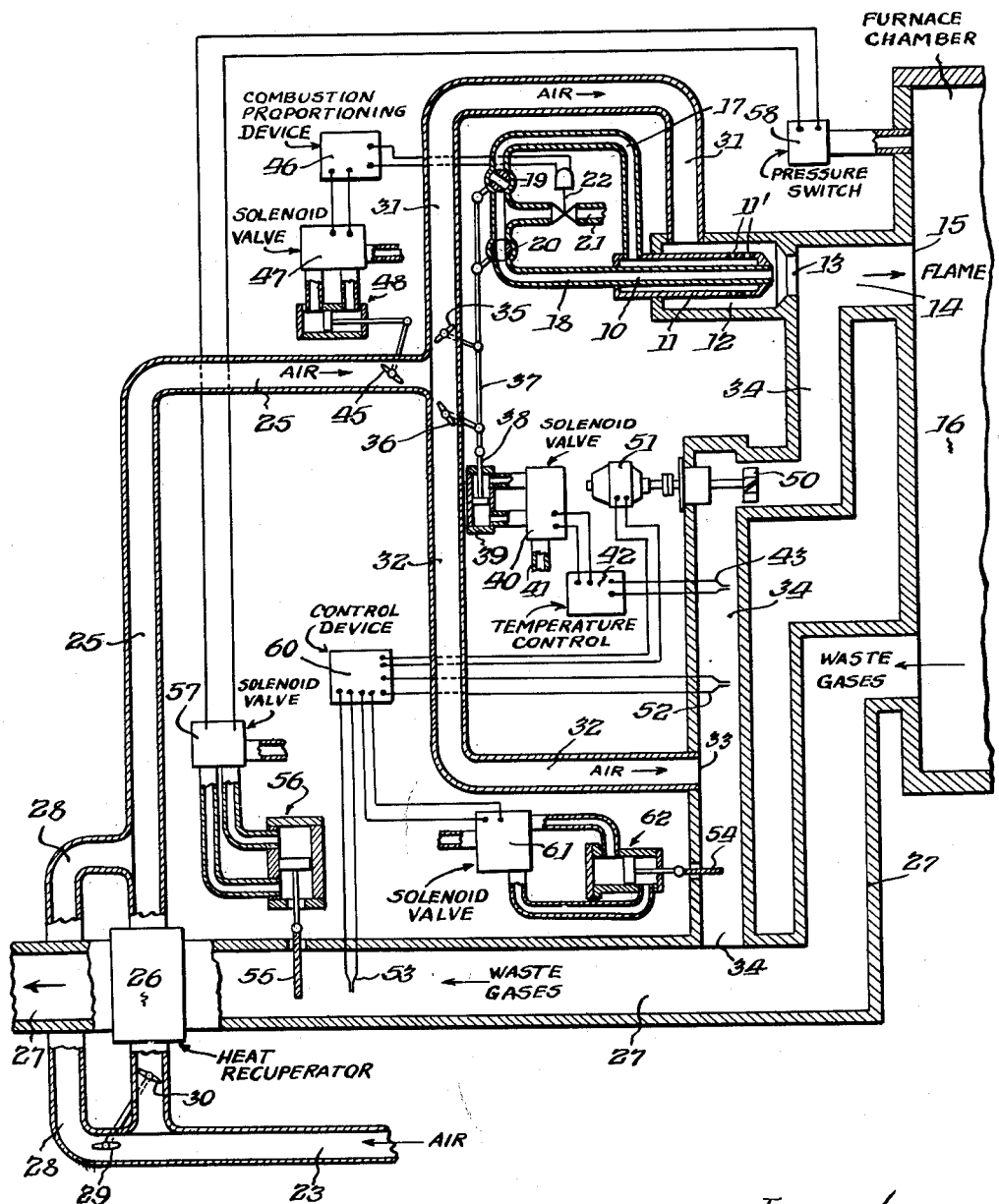

3,146,821
METHOD OF AND APPARATUS FOR GOVERNING THE OPERATION OF FURNACES
Fred H. Wuetig, 7445 S. Chicago Ave., Chicago, Ill.
Filed Aug. 29, 1960, Ser. No. 52,712
9 Claims. (Cl. 158—1)

This invention is concerned with a method of and apparatus for governing the operation of furnaces, for example, heating furnaces, annealing furnaces, soaking pits and the like.

In prior systems, there is provided a burner in which fuel and air are intermixed to produce at the burner port a flame which is directed into the furnace chamber. The combustion temperature thus depends solely upon the mixture of fuel and air, producing a relatively very hot flame and correspondingly hot gases in the furnace chamber, such gases acting moreover in the nature of oxidizing gases. This is in many cases undesirable, for example, in the heating of materials, particularly steel, to a temperature below the melting point, because the very hot flame and the hot oxidizing gases tend to "burn" the steel furnace. In systems where the burner discharges directly into the heating chamber, most of the combustion will take place in the heating chamber, tending to cause channeling and localized burning which will prevent uniform heating.

There are also systems which preheat the air by means of a recuperator or regenerator in order to recover the latent heat from the waste gas, but the use of preheated air with raw fuel also raises the combustion temperature and is often objectionable and there have been attempts to control this temperature by introducing inert or low heat content gases into the fuel system.

Systems for mixing low heat content gases or inert gases with air or raw fuel without means for maintaining the ignition temperature of a mixture of fuel and air can cause the flame to go out and create a dangerous explosion hazard in the furnace or heating chamber. Numerous such explosions have occurred with disasterous results.

Systems in which temperature sensing devices are placed in the heating chamber for detecting gas temperatures cannot determine waste gas temperatures because heat is being lost from the hot gases to the material being heated so that the varying gas temperatures obtained will depend upon the distance from the burner, the rate at which heat is being lost to the material being heated and to the heating chamber walls, and through cracks around the doors, covers, and other openings. Waste gas temperature sensing devices placed in the waste gas duct a reasonable distance from the heating chamber will give a uniform accurate indication of the temperature of the waste gas, since the waste gas duct contains no material to be heated and may be constructed of insulating materials and is tightly sealed, reducing heat losses to a minimum.

The principal object of the invention is to eliminate the above noted drawbacks or at least to improve operating conditions by mixing with the fuel-air combustion mixture already burned flue gases (waste gases) coming from the furnace chamber, at a temperature above the ignition temperaturre of fuel and air, thereby increasing the gas volume at the burner port and rendering the combustion mixture practically nonoxidizing. The resulting combustion mixture will moreover burn at a lower temperature than the mixture of air and fuel alone and the total available heat in the mixture containing the hot waste gases will be greater than the heat available in the mixture consisting of air and fuel alone, which is due to the addition of the latent heat of the waste gas. The larger volume of combustion gas moving through the furnace chamber will diffuse more widely substantially reducing channeling or local burning.

Another object of the invention resides in the development of a method of and apparatus for utilizing the latent heat of the waste flue gases (gases that have at least once passed through the heating chamber), to maintain the ignition temperature of the fuel and to reclaim a portion of this heat in the furnace or heating chamber by recirculating a substantial amount of waste flue gas.

Some of the salient features of the invention are briefly noted below.

The invention provides a long flame burner surrounded by a short flame burner, both burners being disposed in a burner combustion chamber opening into a flame duct having a port which terminates in the furnace chamber. Waste gases leave the furnace chamber through an exhaust conduit leading to a suitable discharge, for example, a chimney, such exhaust conduit being provided with a bypass connected with one branch of an air supply conduit and terminating in the flame duct, for supplying thereto hot waste gases and air for intermixture with the fuel injected thereinto by the long flame burner, another branch of the air supply conduit terminating in the burner combustion chamber for supplying air thereto for intermixture with fuel injected by the short flame burner.

Valve means are disposed in fuel supply conduits which interconnect the two burners and damper or valve means are respectively disposed in the branches of the air supply conduit, and said valve means and damper means are operatively controlled by common link means depending upon the temperature obtaining in the waste gas bypass, whereby fuel and air supply to the short flame burner can be automatically reduced (or increased) while simultaneously increasing (or reducing) the fuel supply to the long flame burner and coincidentally also increasing (or reducing) the air supply to the waste gas bypass.

If desired, heat recuperator means may be provided in the exhaust conduit for utilizing waste gases coming from the furnace chamber, together with valve control means, for selectively preheating the air supplied to the two branches of the air supply conduit.

Damper means are disposed in the waste gas bypass and operatively controlled by the action of temperature sensing means disposed respectively at a point in the bypass and at a point in the exhaust conduit, further damper means being provided in the exhaust conduit and operatively controlled by control means responsive to the pressure obtaining in the furnace chamber in known manner.

The drawing illustrates in semi-diagrammatic form a heating system embodying the invention.

The foregoing and other objects and features of the invention will appear from the description of an embodiment thereof which is rendered below with reference to the accompanying drawing.

Referring now to the drawing, numeral 10 indicates the long flame burner surrounded by the short flame burner 11, the latter having outlets 11' formed therein, such burners forming a unit which is disposed within the burner combustion chamber 12 the orifice 13 of which opens into the flame duct 14, the latter joining a port 15 terminating in the furnace chamber 16. The two burners are interconnected by conduits 17 and 18 containing respectively valves 19 and 20 for controlling the feed of fuel thereto which is supplied to a conduit 21 containing a volume control solenoid valve 22. Air is supplied to the conduit 23 to flow to the duct 25 either through the recuperator 26 in which it is heated by waste gases coming from the furnace chamber 16 and flowing through the exhaust conduit 27, for example, to a chimney, or to flow directly to the duct 25 over the arm 28, the flow of air to the duct 25 being selectively controlled by valves 29 and 30. The duct 25 has a branch 31 which terminates in the burner combustion chamber 12 and a branch 32 which terminates at 33 in the bypass conduit or duct 34, the latter terminating in the flame duct 14 adjacent the orifice 13 of the burner combustion chamber 12. Preheated or cold air can thus be selectively supplied from the conduit 23 over the branch 31 to the burner combustion chamber 12 for intermixture with fuel injected thereinto through the outlets 11' so as to produce a short flame, and over the branch 32 and part of the bypass conduit 34 to the flame duct 14 for intermixture with fuel injected into such duct by the burner 10 so as to produce the long flame.

Dampers or valves 35 and 36 are respectively disposed in the air conduit branches 31 and 32 for controlling the supply of air respectively to the burner combustion chamber 12 (for the short flame burner) and to the flame duct 14 (for the long flame burner).

The fuel supply valves 19 and 20 and the air supply valves 35 and 36 are linked to a common operating rod 37, the actuation of the latter being controlled by a piston rod 38 connected with a piston contained in cylinder 39. The movement of the piston is controlled by a solenoid valve 40 connected to a fluid pressure line 41. The solenoid valve 40 is controlled by the temperature control device 42 in accordance with the temperature in the bypass 34 which is sensed by a thermocouple 43. The valves 19, 20 in the fuel supply lines 17 and 18 and the valves 35, 36 in the air supply branches 31, 32, are thus, by the actuation of the control means 37–43 in accordance with the temperature of the gases flowing in the bypass 34, controlled so that when the valves 20 and 36 open, fuel will be supplied to the long flame burner 10 and air will at the same time be supplied to the flame duct 14 while the valves 19 and 35 are simultaneously closed to shut off fuel and air supply to the short flame burner 11. Conversely, and depending upon the temperature of the gases in the bypass 34, sensed by the thermocouple 43, valves 20 and 36 will be closed to shut off air and fuel supply to the long flame burner 10 while valves 19 and 35 are simultaneously opened to supply fuel and air to the short flame burner 11.

The interplay continues throughout the operation of the apparatus, thus increasing (or reducing) the supply of fuel and air to one burner and at the same time reducing (or increasing) the supply of the fuel and air to the other burner, thereby providing efficient burner control depending upon the temperature of the gases in the bypass 34, such gases containing air, cold or preheated, supplied through the air branch conduit 32 and hot waste gases coming from the furnace chamber 16, exhaust conduit 27 and the bypass 34. The volume of the gas mixture in the flame duct 14 is in this manner increased and the combustion gases entering the furnace chamber 16 are rendered practically nonoxidizing by the admixture of the waste gases.

As has been explained before, the volume of fuel supplied to the burners is governed by the action of a solenoid volume control valve 22 and this volume may be increased or decreased either manually or automatically in response to a suitable controller. The volume of air supplied to the respective air conduit branches 31 and 32 and, therefore, to the burners 10 and 11, for intermixture with the fuel, is similarly governed by an air volume control valve 45 disposed in the main air supply conduit 25 which will automatically increase or decrease the air volume as the fuel volume increases or decreases thereby maintaining a constant fuel to air proportion. Both valves 22 and 45 are controlled by a combustion proportioning device 46, the control of the air volume valve 45 being effected by a solenoid valve 47 which is regulated by the proportioning device 46 and governs the hydraulic system 48 linked to the valve 45 as shown.

A blower 50 which is operated by a motor 51 is provided for recirculating waste gases intermixed with air from the air supply branch conduit 32 through the bypass 34 to the flame duct 14. While this blower is designed to operate at temperatures considerably above the ignition point of the mixture of fuel and air, the invention provides, as a precaution, means for controlling the circulation of waste gases to prevent passage of gases at temperatures above safe operating temperature of the blower, which might damage the blower 50.

The invention provides for this purpose a temperature sensing thermocouple 52 which is disposed in the bypass duct 34 and a damper 54, likewise disposed in the bypass duct 34. The actuation of the damper 55 is controlled by a hydraulic system 56 which is in turn governed by a solenoid valve 57 under control of a pressure switch 58 connected with the furnace chamber 16 so as to maintain substantially uniform positive pressure in the furnace chamber (heating chamber, annealing chamber or soaking pit). It will be noted that the thermocouple 52 is disposed at a point in the bypass 34 above the air supply inlet 33 and the temperature of the recirculated waste gases will thus be lowered by admixture with air.

When the thermocouple 52 senses a temperature of the gases, flowing through the bypass 34, which is above the safe operating temperature of the high temperature blower, signals will be given off to the control device 69 to cause actuation of the solenoid valve 61 which in turn governs the hydraulic system 62 to operate the damper 54 so as to stop the flow of the recirculated waste gases, thereby preventing damage to the blower 50. The thermocouple 52 thereby acts as an overcontrol on the thermocouple 53.

The operation is as follows:

The operation is initiated by actuating switches (not shown) for placing the various control devices such as 46–47, 40–42, 60–61 and 57 on current. Combustion air is supplied to the main air inlet conduit 23 by means of a suitable blower (not shown) and fuel is in suitable manner supplied to the fuel supply line 21. The combustion proportioning device 46 will actuate the fuel volume control valve 22 to maintain fuel volume proportional to air volume and by means of the solenoid valve 47 and the hydraulic system 48 also the air valve 45 in the main air supply conduit 25, thus initiating the supply of air and fuel to the burners. The total volume of air and fuel together or firing rate may be increased or decreased as desired while maintaining a constant fuel to air proportion. Assuming that the system is started cold, the thermocouple 43 will be cold, and the temperature control 42 will in this condition effect actuation of the solenoid valve 40 to move the common control rod 37 so as to open the fuel valve 19 to supply fuel to the short flame burner 11, such fuel being injected through the outlets 11' into the burner combustion chamber 12, and to open the air valve 35 to supply air through the branch conduit 31 to the burner combustion chamber for intermixture with the fuel injected by the burner 11. The fuel valve 20 for the long flame burner 10 will at the same time be closed and the air valve 36 in the branch conduit 32 will also be closed. The combustion mixture in the burner combustion chamber will now be ignited, the short flame burner 11 being in operation, and the burning gases resulting from the intermixture of air and fuel will pass through and preheat the flame duct 14 and through port 15 into the furnace chamber 16. The damper 55 disposed in the waste gas exhaust conduit 27 is initially closed to substantially prevent discharge of exhaust gases. When the pressure in the furnace chamber 16 builds up sufficiently to prevent infiltration of outside air, the pressure switch 58 will be actuated to operate the solenoid valve 57, the latter actuating the hydraulic system 56 to withdraw the damper 55 so as to allow waste gases to escape, for example, to a chimney (not shown). When the waste gases reach a temperature above the ignition temperature of the mixture of fuel, and air, the thermocouple 53 will produce a signal for causing the control device 60 to actuate the solenoid valve 61, thus operatively effecting the hydraulic system 62 to withdraw the damper 54 and to start the motor 51 for actuating the recirculation blower 50. Waste gases from the exhaust conduit 27 are now drawn through the bypass 34 to the flame duct 14 for intermixture with the combustion gases from the short flame burner 11. When the temperature in the bypass 34 reaches a point slightly below the safe operating temperature of the high temperature blower 50, which temperature is considerably above the ignition temperature of the fuel and air mixture, the thermocouple 43 will deliver a corresponding signal to the temperature control 42 and the latter will effect actuation of the solenoid valve 40 so as to cause operation of the hydraulic system 39–38 to move the common control rod 37 for the purpose of operating the fuel valve 19 to reduce fuel supply to the short flame burner 11 while operating the fuel valve 20 to provide fuel supply to the long flame burner 10, at the same time actuating the valve 35 in the air supply branch 31 to reduce air supply to the burner combustion chamber and opening the valve 36 in the air supply branch 32 to supply air to the bypass 34 to flow with the recirculating waste gases to the flame duct 14. The relatively cool combustion air entering the bypass 34 effects cooling of the recirculated waste gases. The long flame burner 10 is now operative, injecting fuel into the flame duct 14 where it is intermixed with the air-waste gas mixture at a temperature above the ignition temperature of fuel and air. Combustion of the mixture of raw fuel and the mixture of air and waste gases will take place in the flame duct 14 and at the port 15 opening into the furnace chamber 16. The heat released by the combustion is added to the latent heat in the recirculated waste gases, giving a larger gas volume with a greater heat content than could be obtained by burning fuel and air alone. Conversely the cycle of operation is reversed if the temperature in the waste gas bypass falls until it reaches the ignition temperature of a mixture of fuel and air whereupon the damper 54 closes stopping the recirculation of waste gas to flame duct 14.

The control of the recirculation of waste gases by means of the thermocouples 52 and 53 and actuating means respectively associated therewith, has been explained before.

Hydraulic systems have been shown for actuating the various valves and dampers. It will be understood, however, that this has been done for convenience of illustration and not for indicating any inherent limitations. Other known systems may be employed for the purpose in view, for example, electromechanical devices including motor operated drums for winding and unwinding cables, or motor operated screws with limit switches, or crank arms cooperatively associated with links, as well as other known devices for producing nonrotational linear motions. Devices such as the pressure switch 58, the combustion proportioning device 46, solenoid valves 47, 40, 57 and 61, as well as the control devices such as 42 and 60 and the heat recuperator 26, are well known and readily available to those experienced in the art, and such devices have therefore been shown diagrammatically as blocks to keep the drawing simple. The preheating of the combustion air by means of a recuperator constitutes an efficient utilization of waste heat but could obviously be effected differently if desired. It may also be mentioned in conclusion that the various valves and dampers may be operated differently even manually if desired.

Changes and modifications may be made within the scope and spirit of the appended claims which define what is believed to be new and desired to have protected by Letters Patent.

I claim:

1. An apparatus for improving the operation of a furnace for heat treating materials disposed therein, comprising means defining a furnace chamber, a burner combustion chamber, a flame duct connecting said burner chamber and said furnace chamber, burner means adjacent said burner combustion chamber for producing a flame directed through said burner combustion chamber and said flame duct into said furnace chamber, and exhaust conduit means for discharging waste gases from said furnace chamber, duct means for supplying air to said burner means, duct means for returning waste gases exhausted from said furnace chamber to adjacent said flame duct for intermixture with fuel and air, said flame duct being of a substantial length to effect complete combustion of the said intermixture of waste gases, air and fuel leaving the flame duct, means disposed in said waste gas return duct for varying the volume of waste gases returned, and means responsive to the temperature of the waste gases disposed in said return duct remote from said furnace chamber for controlling said volume varying means to provide an increased volume of hot combusted gases when the temperature of the waste gas rises above the ignition temperature of a mixture of fuel and air alone supplied by said burner to produce a flame with a larger volume and a temperature lower than a flame produced by a mixture of air and fuel alone.

2. Apparatus according to claim 1, comprising control means for initially effecting operation of said burner means with air and fuel alone, said burner means discharging into the flame duct to preheat it before entering the furnace chamber, means for coincidently impeding the discharge of waste gases from said furnace chamber to build up pressure therein to a point at which infiltration thereinto of outside air is prevented and means for thereupon effecting the discharge of said waste gases.

3. In an apparatus for heat treating materials disposed in a furnace chamber the combination of a structure having walls forming such a furnace chamber, a flame duct terminating in a port formed in a wall of said furnace chamber and an exhaust conduit for withdrawing from said furnace chamber waste gases, means forming a burner combustion chamber operatively connected by said flame duct to the furnace chamber, a first burner and second burner disposed in said burner combustion chamber, means for controlling the supply of air and fuel to the first of said burners, to regulate an initial flame in said burner combustion chamber which is directed into said flame duct and then into said furnace chamber, means in said exhaust conduit for sensing the temperature of said waste gases, a bypass duct extending from said exhaust conduit and terminating in said flame duct, blower means controllable by said means in said exhaust conduit, and said blower means being constructed to operate at temperature substantially above the ignition temperature of a mixture of fuel and air supplied to said burners and disposed in said bypass duct for diverting a portion of said hot waste gases from said exhaust conduit upon the ascertaining by said means in said exhaust conduit of a temperature of said hot waste gases which exceeds the ignition temperature of fuel and air alone supplied by said burners, and means governed by said controlling means for thereafter mixing air with said diverted portion of said waste gases and for supplying fuel to said second burner while reducing the supply of fuel and air to said first burner, said blower means drawing the mixture of air and waste gases into said flame duct for intermixture with the fuel supplied to said second burner to produce in said flame duct a relatively long flame which replaces said initial flame burning in the combustion chamber, the volume of combustion mixture being thereby increased by the addition of said portion of waste gases, such combustion gas mixture burning at a temperature below the flame temperature of the mixture of air and fuel alone and producing a correspondingly substantially increased volume of substantially non-oxidizing combustion gases.

4. Apparatus according to claim 3, comprising means for continuously checking the temperature of the mixture of air and waste gases supplied to said flame duct, and means responsive to said checking means for reducing the supply of waste gases flowing to the flame duct responsive to ascertaining an increase of the temperature of the mixture which exceeds a point of safe operation of said blower means, said continuous checking means acting as an overcontrol of all other means for increasing the flow of waste gas to the flame duct.

5. Apparatus according to claim 4, comprising fuel conduits for respectively supplying fuel to said burners, a main air supply conduit having two branches going respectively to said burner combustion chamber and to said bypass duct, said controlling means including valve means in the respective fuel supply conduits and valve means in the respective air supply branches, a common operating member for all of said valve means, means for actuating said common operating member, and a temperature sensing element in said bypass duct for governing said last named means to increase the air flow to said bypass duct when the waste gas temperature rises above the ignition temperature of a mixture of fuel and air alone supplied by said burners.

6. Apparatus according to claim 5, comprising a further valve in said main air supply conduit controlling the total air supply, control valve means for controlling the total supply of fuel to said burners, and combustion proportioning means for governing the actuation of said further air valve and of said fuel control valve.

7. Apparatus according to claim 4, comprising means for preheating the combustion air, and means for selectively supplying preheated and substantially cold air to said burners to continue to maintain temperatures in said waste gas bypass above the ignition temperature of a mixture of air and fuel alone supplied by said burners and below the safe operating temperature of the blower.

8. Apparatus according to claim 5, said continuously checking means comprising a further temperature sensing element disposed in said bypass duct cooperable with said temperature sensing means in said exhaust conduit, said waste gas reducing means comprising a damper in said bypass duct for controlling the passage of waste gases thereinto, and said continuously checking means also including control means governed by said further temperature sensing element for controlling the operation of said damper to cause the opening of the damper when the temperature of the waste gas reaches the ignition temperature of a mixture of fuel and air alone supplied to said burners, and closing said damper when the temperature of waste gas in the bypass falls below the ignition temperature of a mixture of fuel and air alone supplied to said burners.

9. Apparatus according to claim 5, comprising a motor for actuating said blower, said continuously checking means including a further temperature sensing element disposed in said bypass duct cooperable with said temperature sensing means in said exhaust duct, said waste gas reducing means comprising a damper in said bypass duct for controlling the passage of waste gases thereinto, and said continuously checking means also including control means governed by said further temperature sensing element for controlling the operation of said motor and of said damper to cause said motor and blower to stop and said damper to close when the temperature of the waste gas in the bypass approaches the safe operating temperature of said blower.

References Cited in the file of this patent

UNITED STATES PATENTS

| | | |
|---|---|---|
| 1,332,684 | Renner | Mar. 2, 1920 |
| 1,609,150 | Breese | Nov. 30, 1926 |
| 1,896,910 | Merkt | Feb. 7, 1933 |
| 1,926,714 | Culbertson | Sept. 12, 1933 |
| 2,056,531 | Morton | Oct. 6, 1936 |
| 2,214,452 | Cox | Sept. 10, 1940 |
| 2,258,515 | Mowat | Oct. 7, 1941 |
| 2,458,624 | Morton et al. | Jan. 11, 1949 |
| 2,639,910 | Cone et al. | May 26, 1953 |
| 2,688,360 | Haynes et al. | Sept. 7, 1954 |
| 2,776,827 | Graham | Jan. 8, 1957 |
| 2,991,832 | Dailey | July 11, 1961 |

FOREIGN PATENTS

| | | |
|---|---|---|
| 1,119,245 | France | Apr. 3, 1956 |